(12) United States Patent
Mardirossian

(10) Patent No.: US 6,208,040 B1
(45) Date of Patent: *Mar. 27, 2001

(54) CUSTOMER SIDE POWER MANAGEMENT SYSTEM INCLUDING AUXILIARY FUEL CELL FOR REDUCING POTENTIAL PEAK LOAD UPON UTILITIES AND PROVIDING ELECTRIC POWER FOR AUXILIARY EQUIPMENT

(75) Inventor: Aris Mardirossian, Germantown, MD (US)

(73) Assignee: Technology Patents, LLC, Derwood, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 09/569,035

(22) Filed: May 11, 2000

Related U.S. Application Data

(63) Continuation of application No. 09/251,217, filed on Feb. 16, 1999, now Pat. No. 6,084,318, which is a continuation of application No. 08/856,187, filed on May 14, 1997, now Pat. No. 5,880,536.

(51) Int. Cl.$^7$ .................................................. H02J 1/10
(52) U.S. Cl. ............................ 307/72; 307/38; 307/44; 307/64; 700/291; 700/295
(58) Field of Search ............................ 307/38, 44, 72, 307/64; 700/291, 295

(56) References Cited

U.S. PATENT DOCUMENTS 6,084,318 * 7/2000 Mardirossian ........................ 307/72

* cited by examiner

*Primary Examiner*—Albert W. Paladini
(74) *Attorney, Agent, or Firm*—Nixon & Vanderhye P.C.

(57) ABSTRACT

A customer side power management system including at least one auxiliary fuel cell(s) source is provided. When the power derived from the electric utility reaches a predetermined threshold level, all remaining power needed to supply the customer's loads is obtained from the at least one hydrocarbon powered fuel cell which is/are located within the customer's facility. In such a manner, high peak demand utility charges are avoided by the customer, and the simple cost effective power generation from the fuel cell is provided.

1 Claim, 5 Drawing Sheets

CUSTOMER SIDE POWER MANAGEMENT SYSTEM INCLUDING AUXILIARY FUEL CELL FOR REDUCING POTENTIAL PEAK LOAD UPON UTILITIES AND PROVIDING ELECTRIC POWER FOR AUXILIARY EQUIPMENT

This is a continuation of application Ser. No. 09/251,217, filed Feb. 16, 1999, now U.S. Pat. No. 6,084,318, which is a continuation of application Ser. No. 08/856,187, filed May 14, 1997, now U.S. Pat. No. 5,880,536, the entire contents of which are hereby incorporated by reference in this application.

This invention relates to a customer side power management system including an auxiliary fuel cell disposed at a customer location for reducing peak demand potential upon a corresponding electric utility. More particularly, this invention relates to a system and method for reducing the customer's peak power demand charges from the electric utility by way of the provision of an on-site auxiliary fuel cell which kicks into effect (e.g. outputs additional power) upon the customer reaching a predetermined demand electric power level.

BACKGROUND OF THE INVENTION

Customers or users of large amounts of electric power typically consume such power at uneven or sporadic rates. This is especially true for customers with highly punctuated loads, that is, having many pieces of equipment with frequent stops and starts. Such customers can be expected to build random and cumulative peaks in their power demands.

A typical daily load profile for many industrial manufacturing facilities, retail establishments, and the like, is made up of several randomly acting loads, such as shown in prior art FIGS. 1A–1D. FIG. 1A illustrates a constant twenty-four hour lighting load. FIG. 1B illustrates semi-random punctuated load. FIG. 1C illustrates semi-random longer cycle loads. FIG. 1D illustrates a composite idealized daily load profile, showing high stochastic peaks arising randomly throughout the day.

Despite these fluctuating demands for electric power, electric utilities (e.g. PEPCO) are required to maintain a generating capacity that exceeds the maximum demand for electricity anticipated during any given period of time. Therefore, electric utilities must maintain generating capacities far in excess of average electric power requirements in order to meet such occasional and relatively short term demands. The formation and maintenance of such excess capacities is quite expensive, dramatically increases the average cost of providing electric power to customers, and create excessive pollution in the environment.

In order to better allocate the cost of providing excess power generation capacity to those customers most requiring such capacity, and in order to encourage such customers to distribute their demand for electric power, the utility rates schedule to such customers is typically divided into at least two components. The first component is an energy usage charge which reflects the utility's own energy generation and transmission costs. This charge is typically calculated in cents per kilowatt (KW) hour of energy consumed during a particular billing period. The second component of the bill is a peak demand charge which reflects the utility's capital costs, and is based on the deviation from average energy consumed by the customer during a predetermined demand interval period of time. The peak demand charge is calculated as cents, or dollars, per kilowatt of actual peak demand. Such peak demand charges can be quite high as a percentage of the total utility charge over a predetermined billing period.

Owing to the increased use of greater peak demand charges by electric utilities, large consumers of electricity have begun investigating methods for reducing peak power demands from the utility. One approach is sequencing equipment use so that only an acceptable predetermined number of load contributors are allowed to operate simultaneously. Unfortunately, this method is expensive to control and restrictive to customers.

U.S. Pat. No. 5,369,353 discloses an apparatus that stores energy during periods when excess supply is available, and then releases that energy during times of higher demand. Unfortunately, the apparatus of the '353 patent utilizes a battery, for example, for the energy storage device. The use of a battery for this application is expensive and burdensome, and requires the addressing of recharging issues, replacing such batteries, the expensive nature of the batteries themselves, etc.

U.S. Pat. No. 5,500,561 discloses a power management system including primary and secondary sources of electricity. The system senses peak power demands for electricity and switches a particular load of the customer to a secondary source (e.g. storage battery) so as to reduce peak power demands. Unfortunately, a secondary source disclosed in the '561 patent is also a battery. Thus, the system of the '561 patent suffers from problems similar to those discussed above relating to the '353 patent. Batteries as providers of secondary electricity are undesirable.

It is apparent from the above that there exists a need in the art for a power management system, including a secondary or auxiliary source, that is more cost effective and simpler to utilize than those discussed above.

This invention will now be described with respect to certain embodiments thereof, accompanied by certain illustrations, wherein:

SUMMARY OF THE INVENTION

This invention generally fulfills the above-described needs in the art by providing a customer side electrical power management system comprising:

a main distribution channel, located at a customer location, for receiving electric power from a public electric utility via a plurality of phase lines or wires, said distribution panel for thereafter distributing the received electric power toward a plurality of loads at the customer location;

At least one hydrocarbon-powered fuel cell located at the customer location that receives hydrocarbon fuel and transforms same into electric power to be directed to said loads;

a threshold level setting circuit located at the customer location for allowing the customer to set a maximum power level of power from said utility that the customer wishes to receive and paid for, in order to reduce peak demand charges;

a comparator for determining when the amount of power being received by the customer from said utility reaches said maximum power level; and means for causing all additional power required by the customer that is above said maximum power level to be generated by said at least one fuel cell and to be directed from said at least one fuel cell to said loads thereby reducing the peak demand charges to the customer.

IN THE DRAWINGS

DETAILED DESCRIPTION OF CERTAIN EMBODIMENTS OF THIS INVENTION

Figure 1A:
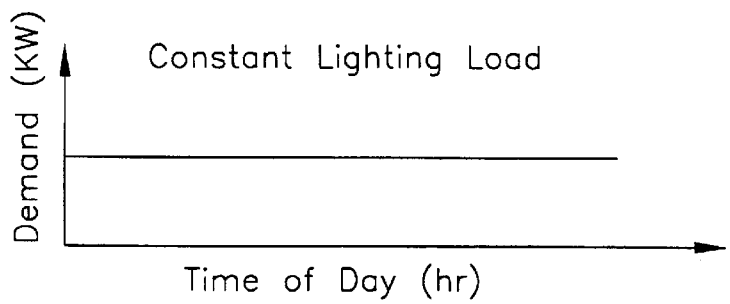
FIGS. 1A–1D are prior art graphs of demand for electric power versus time for typical customer loads.

Referring now more particularly to the accompanying drawings in which like reference numerals indicate like parts throughout the several views.

Figure 2:
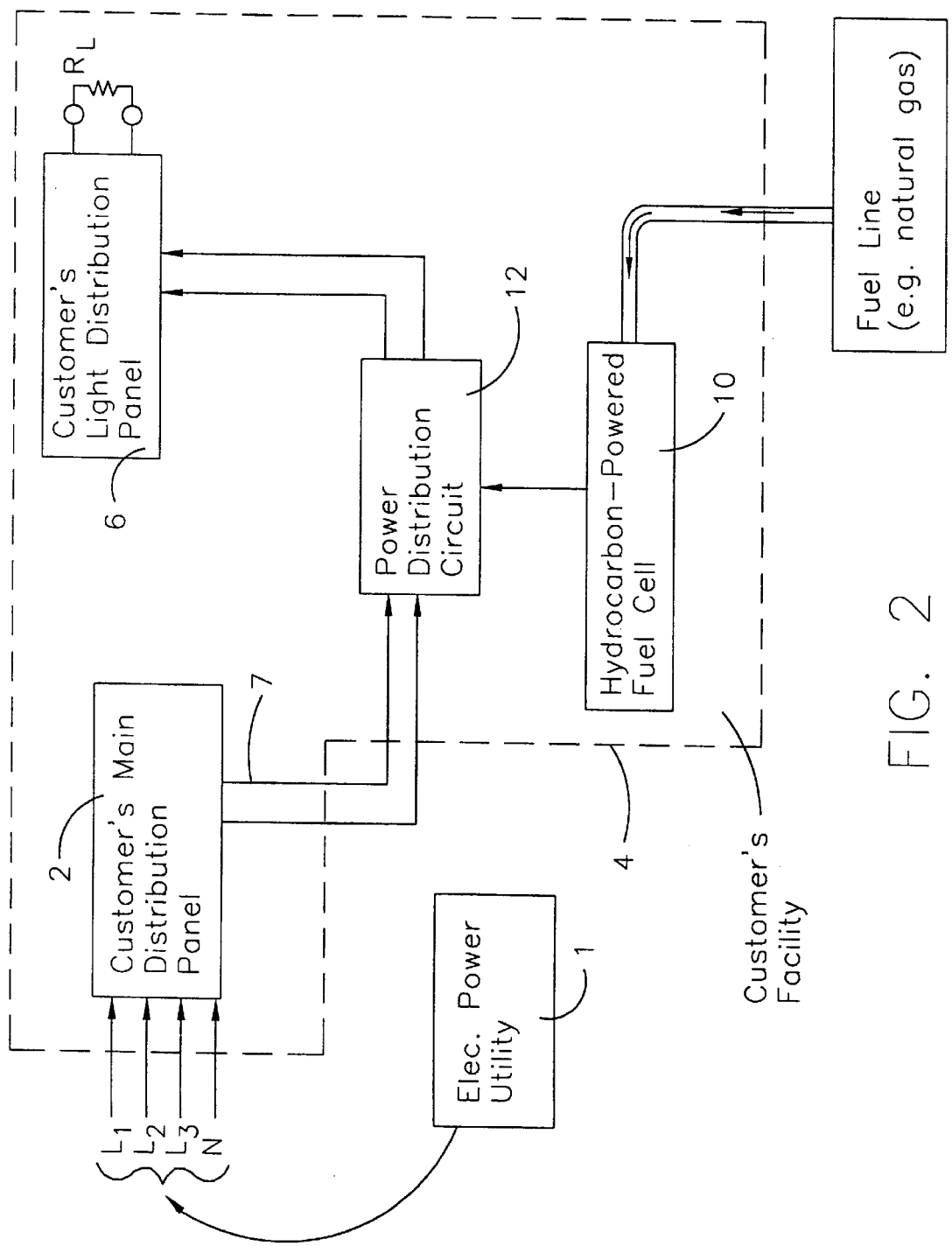
FIG. 2 is a block diagram of a customer side, power management system formed in accordance with certain embodiments of this invention.

Referring now to FIGS. 2–5, it will be seen that a customer side power management system formed in accordance with the present invention may be easily interconnected with existing electric power wiring of a typical customer's facility in order to monitor load requirements of a customer. To facilitate an understanding of the invention, FIG. 2 shows three phase power wiring (i.e. wires labeled L1, L2, and L3 representing the different phases) and a neutral (i.e. end) wire coming from the utility 1 and being received by the customer facility 4. The three phase wires L1, L2, and L3, along with neutral wire N, are received by a main distribution panel 2 located at the customer facility. Main distribution panel 2 distributes the electric power throughout customer facility 4, and in many cases provides power to, for example, lighting distribution panel 6 which distributes power to the various lighting circuits of the customer's facility. Thus, main distribution panel 2 conventionally distributes the three phase power wiring generated by the electric utility throughout the customer facility and in doing so distributes power to the various loads served by the customer facility.

Figure 1B:
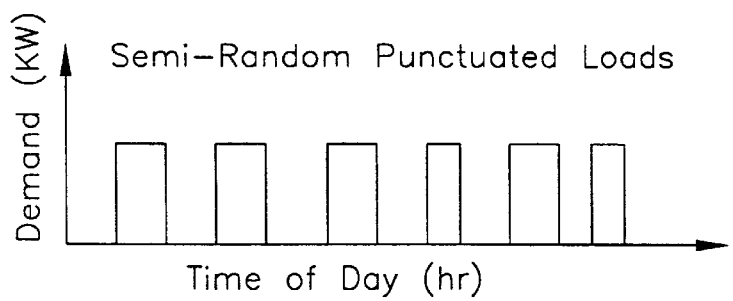
Figure 1C:
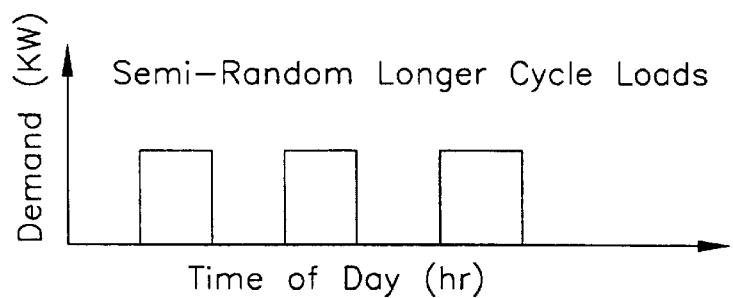
Figure 1D:
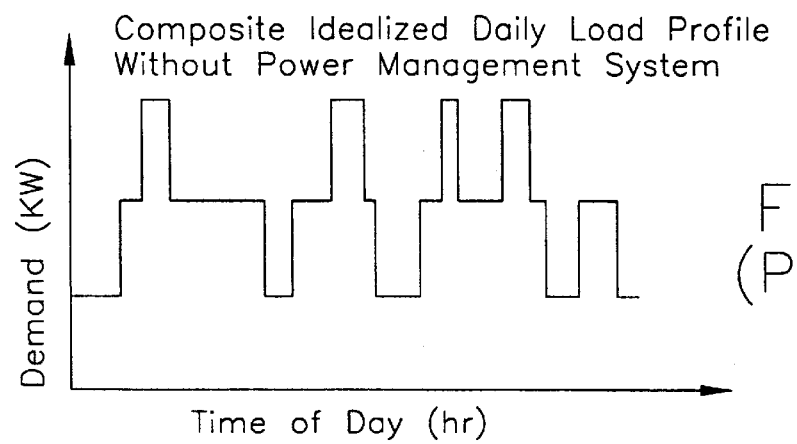

As illustrated in FIGS. 1A–1C, there are three types of common AC electrical loads which may be required to be satisfied by the AC electrical power generated at the public utility 4 and emanating toward and from the illustrated consumer facility. These three loads are the lighting load (FIG. 1A), semi-random punctuated loads (FIG. 1B), and semi-random longer cycle loads (FIG. 1C). Thus, the three phase power wirings L1, L2, and L3 along with neutral wiring N connect from the public utility side of the main distribution channel 2 and issue therefrom as AC electrical conductors 7 on the customer side of panel 2 and thereafter into connection or communication with the composite of loads which are required to be satisfied by the power emanating from utility 1.

In accordance with the instant invention, in addition to the AC power distributed by panel 2, there is provided hydrocarbon powered fuel cell 10 along with power distribution circuit 12, each also at the customer facility. Essentially, original or additional power from fuel cell 10 is generated and supplied to the customer's loads when it is determined by means within circuit 12 that the level of power being derived from the utility 1 has reached a predetermined power threshold or level as will be discussed further below. At this time, the fuel cell 10 will either generate additional electric power or start to generate such power, so that no more power is required from the public utility 1.

Figure 5:
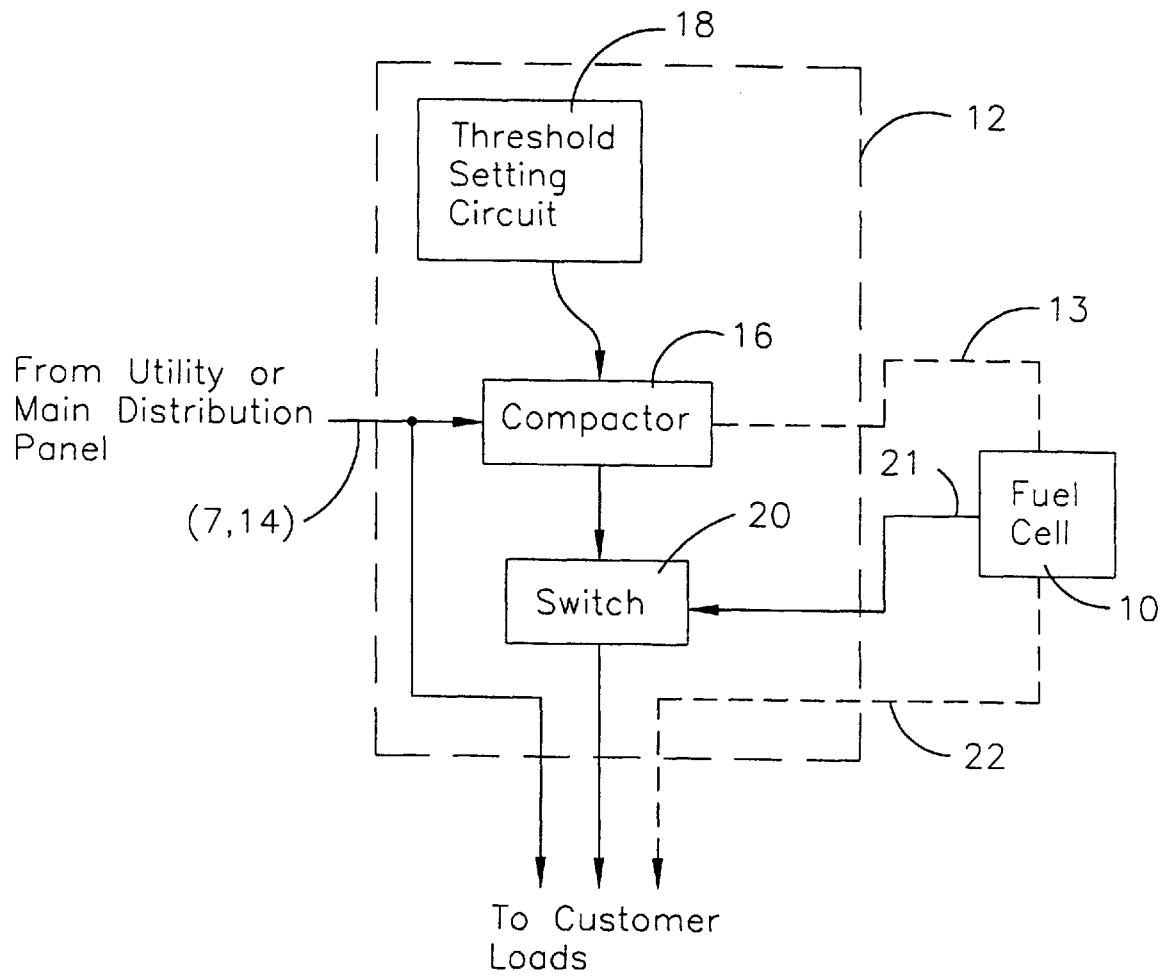

Referring now to FIGS. 2 and 5, power distribution circuit 12 will be described in further detail. Firstly, circuit 12 receives an input(s) from either distribution panel 2 or directly from the lead lines L1–L3 from the utility, this input being designated by reference numeral 14, and is indicative of the power being derived by the customer's loads from the electric utility. Comparator 16 functions to compare the power or level of signal 14 with a predetermined threshold level set by circuit 18 so as to determine whether the power level being derived from the utility by the customer's loads has reached the predetermined threshold level which necessitates kicking in the power (original or additional) from the fuel cell 10. When comparator 16 determines that the power being derived from the utility has not yet reached the predetermined threshold level, switch 18 remains closed and the utility (i.e. lines L1–L3) remains the sole supply of power for the customer's loads. Optionally, even before the threshold level is met, the fuel cell may be used to generate some amount of power in order to maintain efficiency or save power costs.

However, when comparator 16 determines that signal 14 has reached the predetermined level set by user-controlled circuit 18, comparator instructs switch 20 to open thereby allowing original or additional electric power from fuel cell 10 to aid in supplying power to the customer's loads. Optionally, a predetermined amount of power 22 from the fuel cell may always be supplied to the loads regardless of whether switch 20 is opened or closed. In other embodiments, when the level is reached, circuit 12 directly instructs the fuel cell 10 via line 13 to generate original or additional electric power. Thus, circuit 12 controls the distribution of power from and between the utility and the fuel cell, whereby additional electric power from cell 10 is directed toward the customer's loads so as to supply same whenever the predetermined threshold level set by circuit 18 has been reached by the power being derived from the utility.

Figure 3:
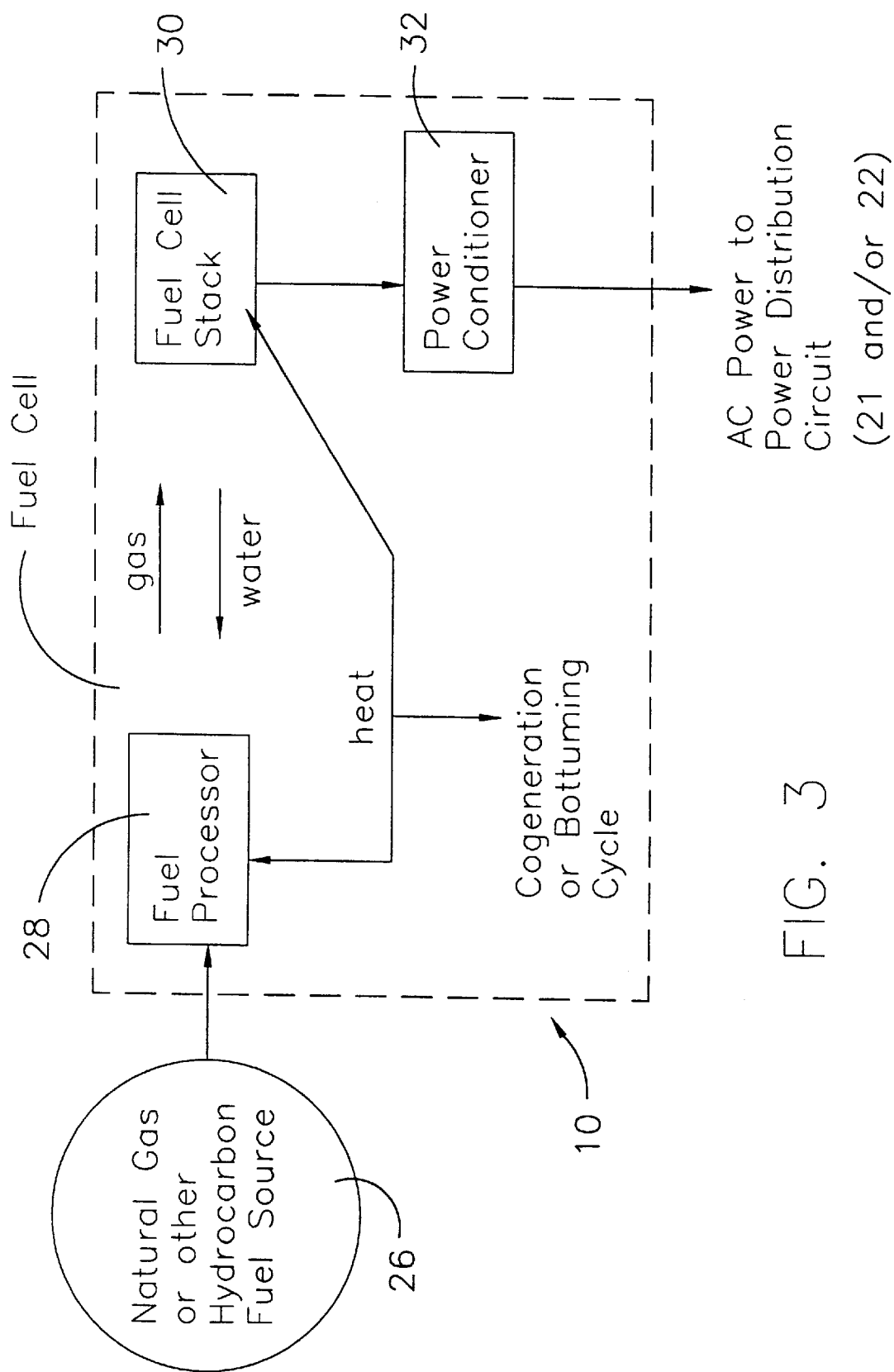
FIG. 3 is a block diagram of the hydrocarbon powered fuel cell to be used in conjunction with the embodiment of FIG. 2, according to certain embodiments of this invention.

FIG. 3 is a block diagram of fuel cell 10 according to certain embodiments of this invention. As illustrated, fuel cell 10 is powered by natural gas or other known hydrocarbon materials from source 26. This fuel makes its way to fuel processor 28 which interacts with fuel cell stack 30 and power conditioner 32 in a known manner so as to generate AC power 21 and/or 22 which is directed toward the customer's loads to be powered.

Figure 4:
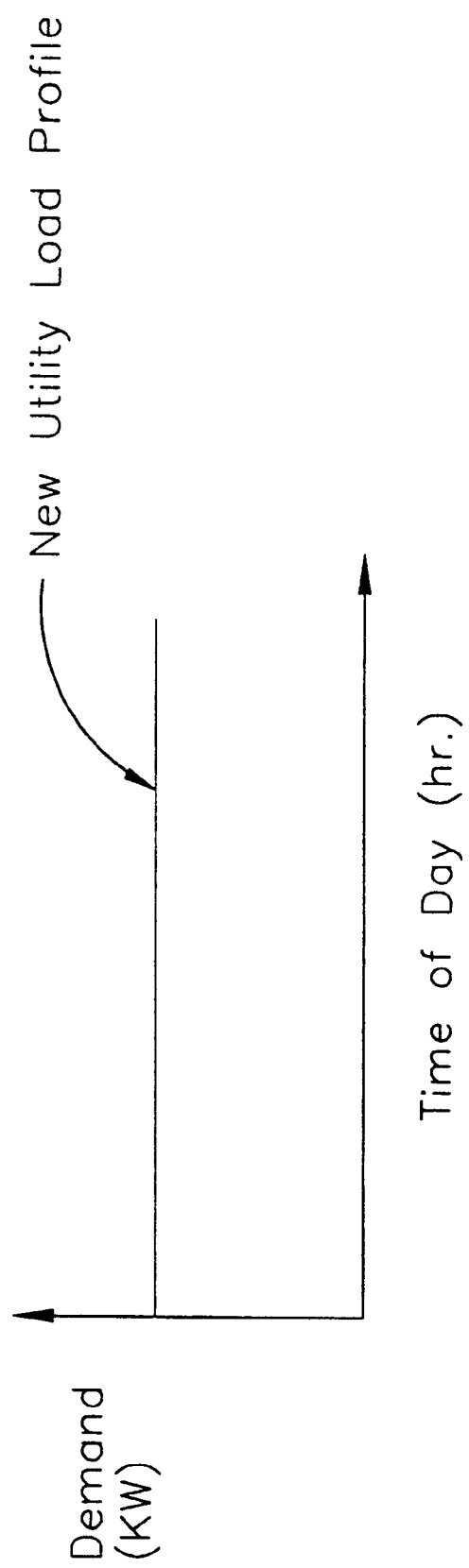
FIG. 4 is a graph of demand for electric power against time, due to the implementation of certain embodiments of this invention.

FIG. 4 illustrates an exemplary demand versus time of day graph resulting from certain embodiments of the instant invention. Due to the utilization of the power from the fuel cell whenever the predetermined utility power level being received has reached a predetermined level, the utility load profile paid for by the customer may remain substantially flat and thereby allowing the customer to avoid payment of costly peak demand charges as described in the background herein.

Once given the above disclosure, many other features, modifications, and improvements will become apparent to the skilled artisan. Such other features, modifications, and improvements are therefore considered to be a part of this invention, the scope of which is to be determined by the following claims:

I claim:

1. A method of operating a customer side electrical power management system, the method comprising the steps of:

receiving electric power from a public electric utility via at least one phase line or wire, and thereafter distributing the received electric power toward at least one load at a customer location;

providing at least one hydrocarbon-powered fuel cell at the customer location, the at least one hydrocarbon-powered fuel cell receiving hydrocarbon fuel and transforming the hydrocarbon fuel into electric power to be directed to the load;

providing a threshold level setting circuit at the customer location, the threshold level setting circuit allowing a customer to set a maximum power level of power from the utility that the customer wishes to receive and pay for;

determining when the amount of power being received by the customer from the utility reaches the maximum power level; and causing all additional power required by the customer that is above the level to be generated by the at least one fuel cell to be directed from the at least one fuel cell to the load.

* * * * *